United States Patent [19]

Uchida

[11] 4,325,091

[45] Apr. 13, 1982

[54] CASSETTE TAPE RECORDER

[75] Inventor: Yoshitsugu Uchida, Yokohama, Japan

[73] Assignee: Victor Company of Japan, Limited, Yokohama, Japan

[21] Appl. No.: 116,864

[22] Filed: Jan. 30, 1980

[30] Foreign Application Priority Data

Jan. 31, 1979 [JP] Japan ............................. 54-11197[U]

[51] Int. Cl.³ .......................................... G11B 15/00
[52] U.S. Cl. .................................... 360/96.6; 360/137
[58] Field of Search ..................... 360/96.6, 96.5, 137, 360/69

[56] References Cited

U.S. PATENT DOCUMENTS 4,050,087 9/1977 Kishi .................................. 360/96.6
4,150,410 4/1979 Tsumura ........................... 360/96.5

Primary Examiner—John H. Wolff

Attorney, Agent, or Firm—Lowe, King, Price & Becker

[57] ABSTRACT

A cassette tape recorder comprises a cassette holder having a pair of spaced arm portions each having at its leading end a recess; a shaft spanned between a pair of spaced brackets in a manner that an end of the shaft is projected outwardly from one of the brackets to form an exposed shaft section, the recesses of the receiving therein the shaft to permit the cassette holder to be pivotable about the shaft; an arm member having an opening through which the exposed shaft section passes to permit the arm member to be pivotable about the exposed shaft section; a connector to provide for simultaneous pivotting movements of the cassette holder and the arm member under a condition wherein the arm portions of the cassette holder are operatively mounted on the shaft; biasing the arm member to cause it pivot in one direction about the exposed shaft section; and a brake for causing the pivotting movement of the arm member in the one direction to be damped.

12 Claims, 16 Drawing Figures

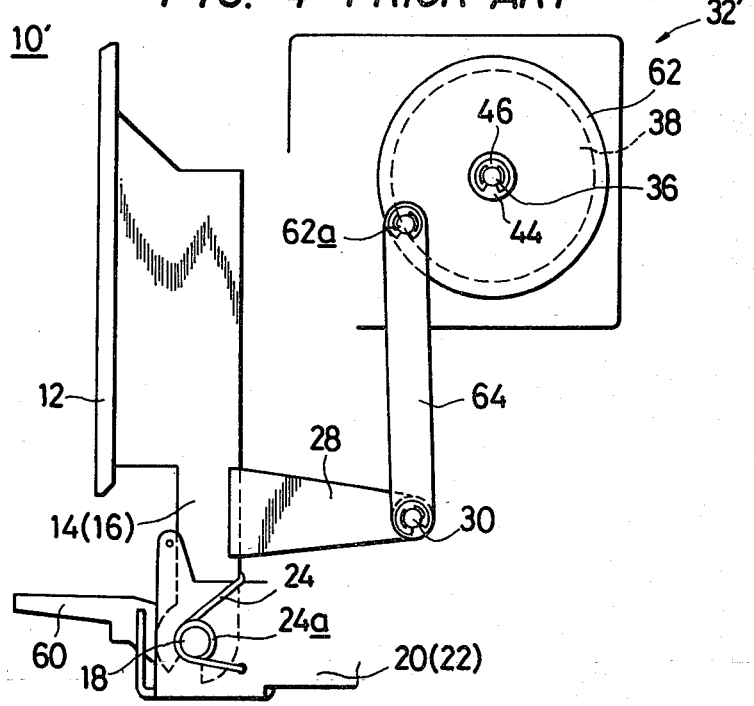
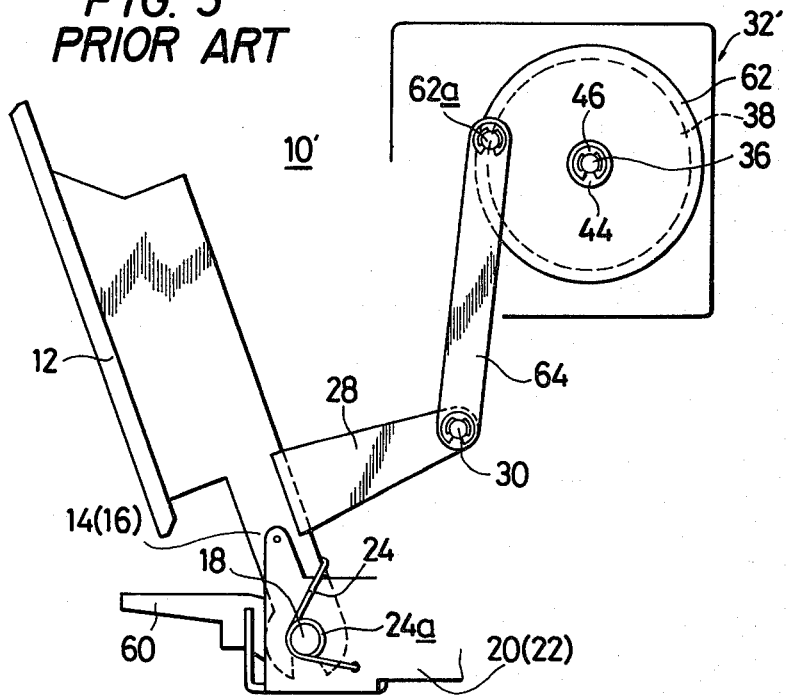

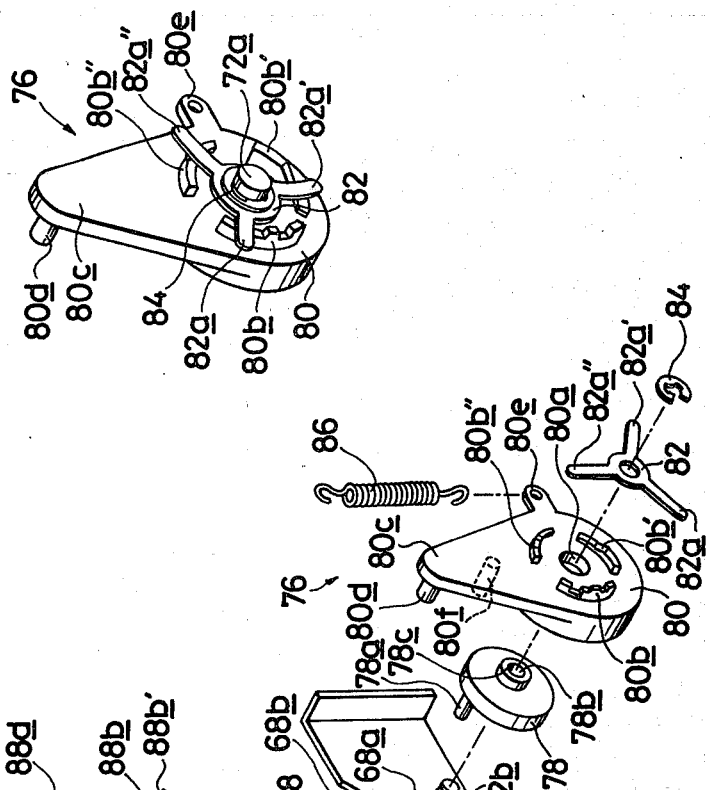
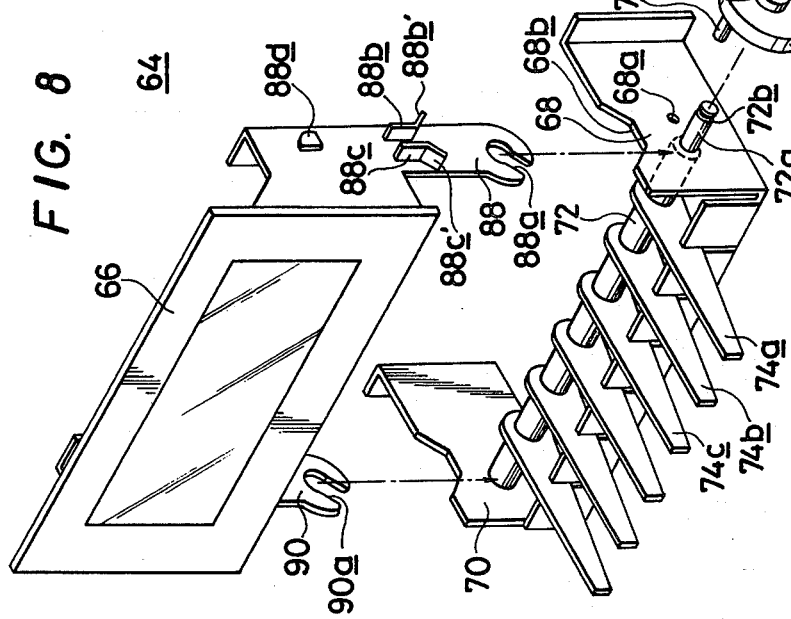

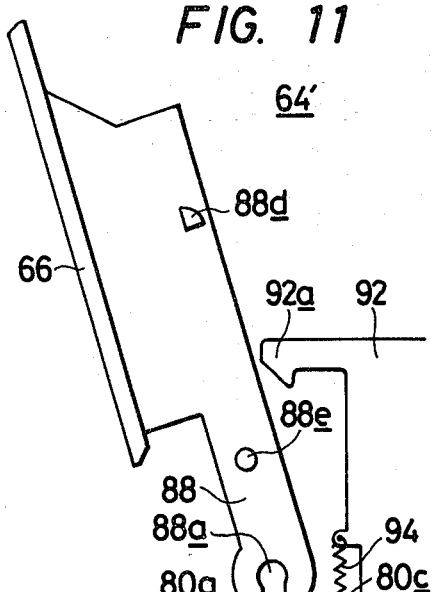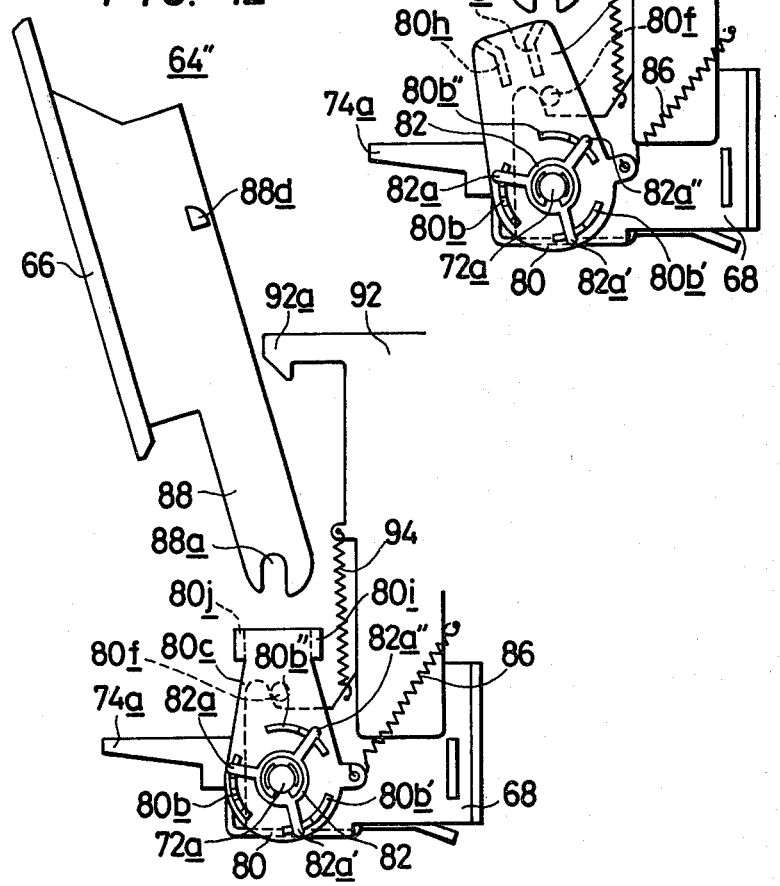

CASSETTE TAPE RECORDER

FIELD OF THE INVENTION

The present invention relates in general to a tape recorder, and more particularly to a cassette tape recorder having a cassette holder which is pivotable between a closed position thereof wherein a tape cassette received in the holder is operatively engaged with the recording and reproducing mechanism of the recorder and another position thereof wherein the tape cassette is ready to be ejected from the holder.

OBJECTS OF THE INVENTION

It is an object of the present invention to provide an improved cassette tape recorder having a cassette holder, in which the holder can be installed to the assembled recording and reproducing mechanism at the final step of the assembling procedure of the recorder.

It is another object of the present invention to provide an improved cassette tape recorder in which the cassette holder thereof can be mounted to the assembled recording and reproducing mechanism after the mechanism and a cabinet (or decorative cover member) are assembled together.

It is still another object of the present invention to provide an improved cassette tape recorder in which the mounting and dismounting of the cassette holder to and from the assembled recording and reproducing mechanism are easily made by simple manual action.

It is a further object of the present invention to provide an improved cassette tape recorder which is constructed by reduced number of parts, thereby facilitating the assembling procedure of the recorder and lowering the production cost of the same.

Other objects and advantages of the present invention will become apparent from the following description when taken in conjunction with the accompanying drawings.

BRIEF DESCRIPTION OF THE DRAWINGS

FIGS. 1 and 2 are side views of a conventionally used cassette tape recorder having a cassette holder, in which FIG. 1 is a view showing a condition wherein the cassette holder is in a closed position and FIG. 2 is a view showing a condition wherein the cassette holder is in an open position;

FIGS. 4 and 5 are side views of another conventionally used cassette tape recorder with a recording and reproducing mechanism omitted from the drawings, in which FIG. 4 is a view showing a condition wherein the cassette holder is in the closed position, and FIG. 5 is a view showing a condition wherein the cassette holder is in the open position;

FIGS. 6 and 7 are side views of an improved cassette tape recorder, according to a first preferred embodiment of the present invention, in which FIG. 6 is a view of the recorder showing a condition wherein the cassette holder is locked to take its closed position, placing a tape cassette at working position, and FIG. 7 is a view of the same showing a condition wherein the cassette holder is unlocked to take its open position, permitting the tape cassette to be removed from the holder;

FIG. 8 is an exploded view of the cassette tape recorder of FIGS. 6 and 7, with a recording and reproducing mechanism being omitted from the drawing for clarification of the drawing;

FIG. 9 is a perspective view of a braking mechanism employed in the recorder of the first embodiment;

FIG. 11 is a side view of a cassette tape recorder of a second preferred embodiment according to the present invention;

FIG. 12 is a view similar to FIG. 11, but shows a third preferred embodiment of the present invention;

DESCRIPTION OF PRIOR ART

Prior to describing improved cassette tape recorders according to the present invention, outlined explanation of conventional cassette tape recorder will be made with reference to FIGS. 1 and 3 and FIGS. 4 and 5 in order to clarify the invention.

Figure 1:
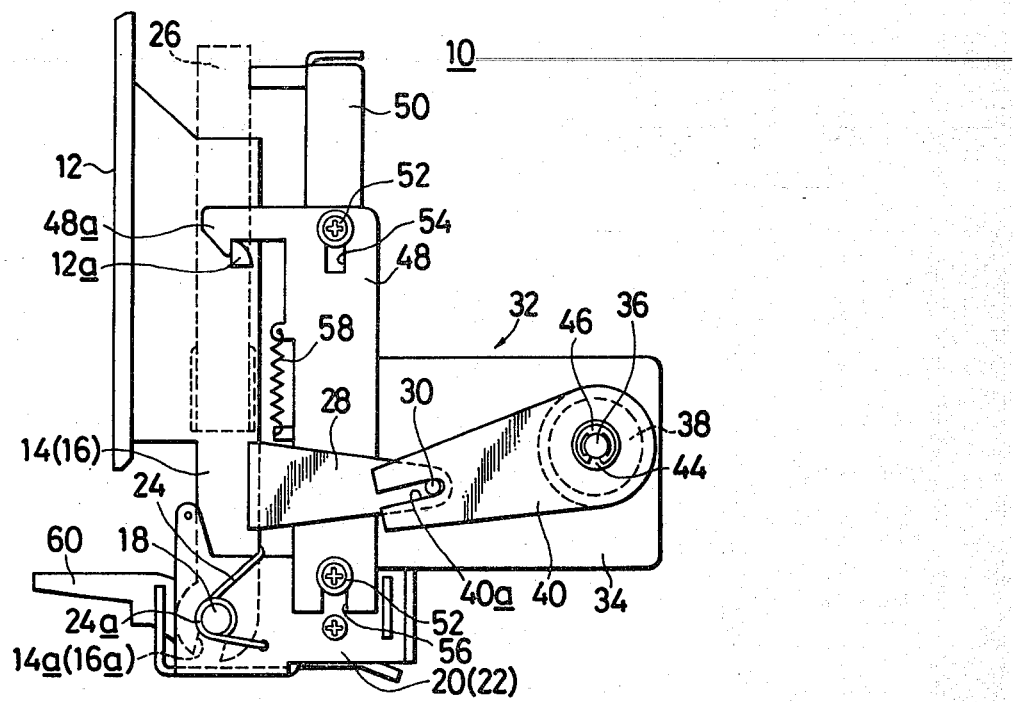
Figure 2:
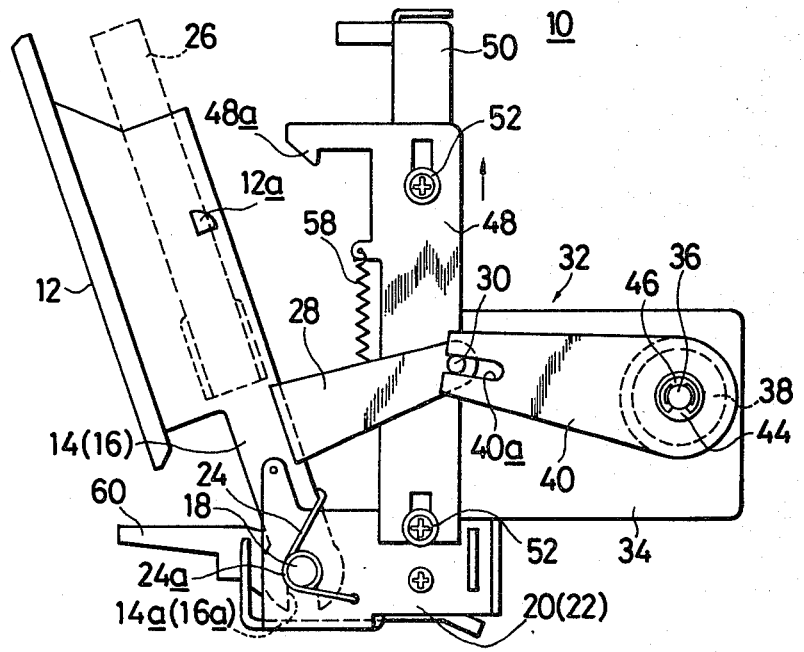
Figure 3:
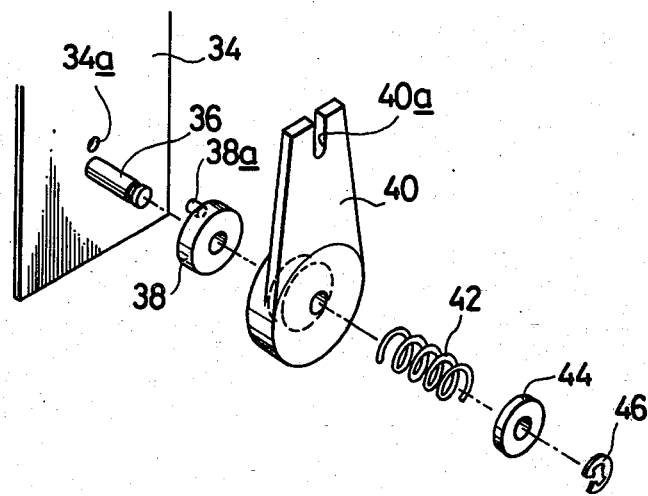
FIG. 3 is an exploded view of a braking mechanism employed in a pivotting system of the cassette holder of FIGS. 1 and 2.
Figure 6:
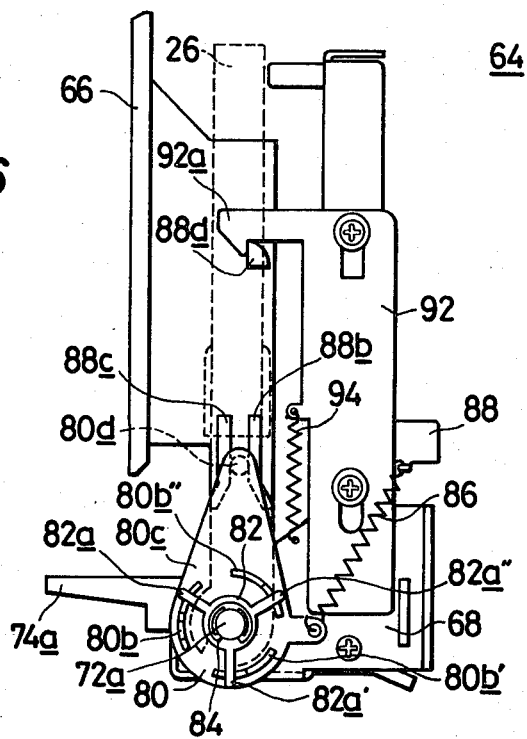
Figure 7:
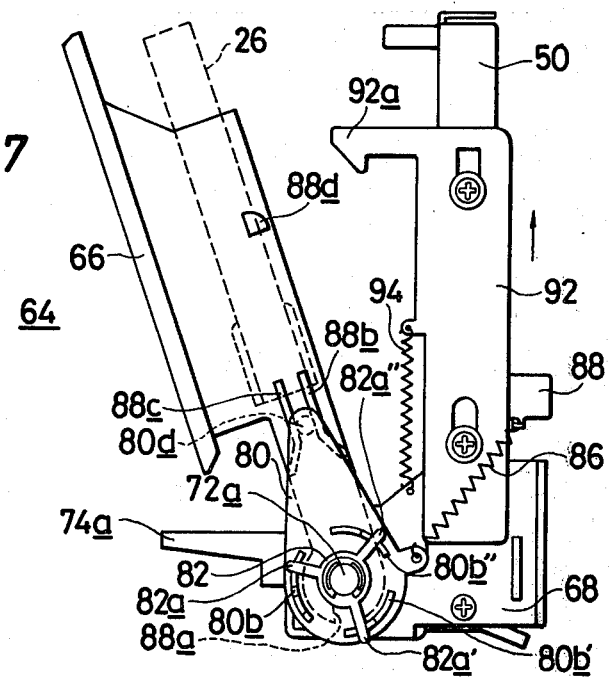

Referring to FIGS. 1 to 3, there is shown an example of conventional cassette tape recorders. The recorder designated by numeral 10 generally comprises a cassette holder 12 constructed of, for example, a plastics. The holder 12 has a pair of spaced arm portions 14 and 16 each having at its leading end an engaging recess 14a or 16a. The recesses 14a and 16a of the arm portions 14 and 16 slidably engage with an elongate shaft 18 which is spanned between a pair of spaced brackets 20 and 22 fixed to a suitable portion of a recording and reproducing mechanism (not shown). Thus, the cassette holder 12 is pivotable about the axis of the shaft 18. A spiral spring 24 is disposed at its coil portion 24a about one end of the shaft 18 with its both ends respectively engaged with the bracket 20 and the arm portion 14 so that the cassette holder 12 is biased to pivot about the shaft 18 in a direction from a closed position wherein a tape cassette 26 is operatively engaged with the recording and reproducing mechanism to an open position wherein the tape cassette 26 is ready to be put into or removed from the cassette holder 12. The arm portion 16 of the holder 12 is provided with an arm 28 of which the leading end is provided with a pin 30. As will be explained hereinafter, the pin 30 is engaged with a braking mechanism 32 so that the pivotal movement of the cassette holder 12 from the closed position to the open position is slowly made or damped.

The braking mechanism 32 for the cassette holder 12 is assembled on a bracket 34 fixed to a suitable portion of the recording and reproducing mechanism. As is best shown in FIG. 3, the braking mechanism 32 comprises a shaft 36 fixed to the bracket 34. A discal base member 38 having thereon a pin 38a is disposed about the shaft 36 with the pin 38a engaged with an opening 34a formed in the bracket 34. A rotating arm 40 having a circular end portion is rotatably disposed at the circular end portion about the shaft 36 in a manner to be frictionally contacted at an inside surface of the circular end portion with an outside surface of the discal base member 38. Although not shown in the drawings, a sticky grease is applied to the contacting surfaces of the discal base member 38 and the rotating arm 40 so that the suitable friction force is generated at the contacting surfaces upon rotation of the rotating arm 40 relative to the stationary discal base member 38. The rotating arm 40 has at a free end thereof a recess 40a which is to be operatively engaged with the pin 30 of the afore-mentioned arm 28. A coil spring 42 and a washer 44 are also disposed on the shaft 36 at positions outboard of the rotating arm 40 and an E-ring 46 is fixed to a leading end of the shaft 36 in a manner to compress the spring 42 against the outboard surface of the circular end portion of the rotating arm 40 with the aid of the washer 44, so that the frictional movement of the rotating arm 40 relative to the stationary installed discal base member 38 is assuredly accomplished. With this, installed discal base member 38 is assuredly accomplished. With this, it is appreciated that the pivotting movement, more specifically, the opening movement of the cassette holder 12 is slowly made or damped by the braking mechanism 32.

Designated by numeral 48 is a locking lever which is longitudinally movably supported by a stationary support member 50 via pins 52 fixed to the stationary support member 50, each pin 52 being passed through an elongate opening 54 or recess 56 formed in the locking lever 48 as shown in the drawings. The locking lever 48 is formed at its top section with a hook portion 48a which is lockingly engageable with a projection 12a formed on the cassette holder 12. A spring 58 is arranged between the stationary support member 50 and the locking lever 48 to bias the locking lever 48 in a downward direction with respect to the stationary support member 50, so that when the cassette holder is forced to pivot about the pivotting shaft 18 against the force of the spring 24 and takes the closed position thereof, the projection 12a of the cassette holder 12 is caught with a snap by the hook portion 48a of the locking lever 48, permitting the holder 12 to be locked in the closed position thereof, as is shown by FIG. 1. Under this condition, when an eject button (not shown) is pushed down, the locking lever 48 is shifted upward (that is in the direction indicated by an arrow in FIG. 2) releasing the projection 12a from the hook portion 48a, with a result that the cassette holder 12 is pivotted to take the open position thereof, by the force of the spring 24, as is shown by FIG. 2.

Designated by numeral 60 is one of the well-known buttons of a cassette tape recorder, such as record button, fast-forward button, forward button, stop button, reverse button or fast-reverse button.

Referring to FIGS. 4 and 5, there is shown another example of conventional cassette tape recorder. For facilitation of the drawing, the recording and reproducing mechanism is omitted from the drawing. The cassette recorder 10 of this example is the same as the afore-mentioned first example of FIGS. 1 to 3 except for a braking mechanism. Thus, in the drawings, the same parts as those in is the first example are designated by the same numerals. The braking mechanism 32' of the second example has a rotating discal plate 62 and a connecting arm 64 instead of the afore-mentioned rotating arm 40 of the first example. As may be imaginzed from FIG. 3, the discal plate 62 is disposed about the shaft 36 between the discal base member 38 and the coil spring 42 to achieve damped movement thereof. The connecting arm 64 is pivotally connected at its one end to a pin 62a fixed to a peripheral edge of the plate 62, and at its other end to the pin 30 fixed to the arm 28. With this, it will be appreciated that the pivotting movement of the cassette holder 12 toward the open position thereof is slowly made or damped.

As has been described herein above, both the first and second examples of the conventional cassette tape recorders 10 and 10' have, as independent parts, a pivotting shaft 18 for pivotally supporting the cassette holder 12 on the brackets 20 and 22, a shaft 36 for supporting thereon the elements of the braking mechanism 32 or 32' and a connecting element for operatively connecting the cassette holder 12 with the braking mechanism 32 or 32'. This causes increase in number of parts of the recorders. Further, by the nature of the construction of the first and second examples, the cassette holder 12 must be installed to the recorder and reproducing mechanism prior to mounting the latter to a cabinet as will be understood hereinlater, and the adjustment of the braking force applied to the cassette holder 12 by the braking mechanism 32 or 32' must be made by replacing the coil spring 42 with another one. These cause difficulty and complexity in assembling the recorders.

Thus, it is an essential object of the present invention to provide an improved cassette tape recorder which is free of the above-mentioned drawbacks encountered in the conventional cassette tape recorders. The following is the description about the improved cassette tape recorders according to the present invention.

DESCRIPTION OF THE PREFERRED EMBODIMENTS

Referring to FIGS. 6 to 10, there is illustrated a first preferred embodiment according to the invention. For facilitation of the drawing, the recording and reproducing mechanism of the recorder is omitted from the drawing. As is best shown in FIG. 8, the cassette tape recorder 64 of this first embodiment comprises a cassette holder 66 in which a tape cassette 26 (see FIGS. 6 and 7) is to be received. As will become apparent hereinafter, the cassette holder 66 can be removably fixed to a given portion of the cassette tape recorder 64 at the final step of the assembling procedure of the recorder 64. Preferably, the cassette holder 66 is constructed of a plastics. Designated by numerals 68 and 70 are spaced brackets which are fixed to a suitable portion of the recording and reproducing mechanism (not shown). An elongate shaft 72 is spanned between the brackets 68 and 70. As will become apparent as the description proceeds, the shaft 72 can act as a common shaft for the cassette holder 66, a braking mechanism 76 and push buttons 74a, 74b and 74c such as record button, forward button, reverse button, etc. As shown, one end of the shaft 72 passes through the bracket 68 to form a reduced diameter stub section 72a on the outboard side of the bracket 68.

The braking mechanism 76 of this embodiment comprises a discal base member 78 which is disposed on the stub section 72a in such a manner that a pin 78a formed on the base member 78 is engaged with an opening 68a formed in the bracket 68. Thus, rotation of the discal base member 78 about the reduced diameter stub section 72a is prevented. The discal base member 78 has on its outboard side a coaxially extending cylindrical bearing section 78c which is to be slidably received in an opening 80a of a next-mentioned rotating arm 80. As shown, the rotating arm 80 has the opening 80a at the center of a circular end section thereof. The assemblage of the rotating arm 80 with the discal base member 78 is such made that facing faces of them frictionally contact each other. Although not shown, a suitable sticky grease is applied to the contacting faces of them. It should be noted that the cylindrical bearing section 78c can be deleted. In this case, however, the opening 80a of the rotating arm 80 must be sized or reduced to match the diameter of the stub section 72a in order to directly support the arm 80 on the stub section 72a. The circular end section of the arm 80 is formed at its outboard side with three arcuate ribs 80b, 80b' and 80b'' which are spaced from each other and coaxial with the opening 80a. Each of the ribs 80b, 80b' and 80b'' has stepped top, as shown. The ribs 80b' and 80b'' have gently slanted portions (no numerals) at one ends thereof, respectively. While, the rib 80b has a recess (no numeral) at each step portion thereof. The height of of the depth of each recess of the rib 80b is the same the heights of the corresponding steps on the ribs 80b' and 80b''. A spider plate spring 82 having three radially outwardly extending arms 82a, 82a' and 82a'' is disposed on the stub section 72a of the shaft 72, and an E-ring 84 is fixed to the leading end of the stub section 72a. Now, it should be noted that for ease of assemblage, the fixing of the E-ring 84 to the stub section 72a, more specifically to an annular groove 72b formed in the stub section 72a is made under a condition wherein the spider plate spring 82 is disengaged the ribs 80b, 80b' and 80b''. After this, the arms 82a, 82a' and 82a'' of the spring 82 are put on first (or lowest) steps of the corresponding ribs 80b, 80b' and 80b'' in a manner as shown in FIG. 9 so as to generate a biasing force which presses the circular end section of the arm 80 to the discal base member 78. The arm 82a of the spring 82 is then engaged with the recess of the first step of the rib 80b in order to assure retainment of the spring 82 on the ribs 80b, 80b' and 80b''. Thus, it will be appreciated that the rotation of the rotating arm 80 relative to the discal base member 78 is frictionally made or braked, and the contacting force between the rotating arm 80 and the discal base member 78 is thus easily controlled or varied by changing the relative positions between the arms of the spring 82 and the stepped tops of the corresponding ribs of the rotating arm 80. The rotating arm 80 has a lug 80e to which an end of a spring 86 is fixed. The other end of the spring 86 is connected to a bracket 67 mounted on a suitable stationary portion of the recording and reproducing mechanism (not shown) so that the rotating arm 80 is biased to pivot in a counterclockwise direction in FIG. 8. As will become apparent as the description proceeds, the biasing force generated by the spring 86 acts to bias the cassette holder 66 to pivot toward the open position thereof. The rotating arm 80 has at the other end 80c a stub 80d which extends inboard. Similarly to the prior art examples hereinabove described, the cassette holder 66 has a pair of spaced arm portions 88 and 90 each having at its leading end an engaging recess 88a or 90a. As is indicated by the phantom lines in FIG. 8, the engaging recesses 88a and 90a of the arm portions 88 and 90 slidably engage with the elongate shaft 72, permitting the cassette holder 66 pivotable about the shaft 72. The arm portion 88 is provided at its outboard side with a pair of facing ribs 88b and 88c which are spaced suitably to define therebetween a clearance into which the above-mentioned stub 80d of the rotating arm 80 is to be inserted. As shown, lower sections 88b' and 88c' of the ribs 88b and 88c are bent in directions to be separated from each other for the reasons which will become apparent hereinafter. Designated by numeral 88d is a projection which has the same function as the afore-mentioned projection 12a of FIGS. 1 and 2. Upon proper mounting of the arm portions 88 and 90 on the shaft 72, the stub 80d of the rotating arm 80 is received between the ribs 88b and 88c. With this, it will be appreciated that the cassette holder 66 is biased to rotate in a counterclockwise direction in FIG. 8 by the force of the spring 86. Thus, when unlocked, the casing 66 takes its open position. As indicated by broken lines in FIG. 8, the rotating arm 80 is provided at its inboard side with a stopping projection 80f (see FIG. 10a) which is engageable with an inclined side of a recess 68a formed in a bracket 68 connected to the recorder mechanism (not shown) to limit the counterclockwise rotation of the recorder arm 80. The mounting procedure of the cassette holder 66 with respect to the shaft 72 will be well understood from FIGS. 10A, 10B and 10C.

Figure 10C:
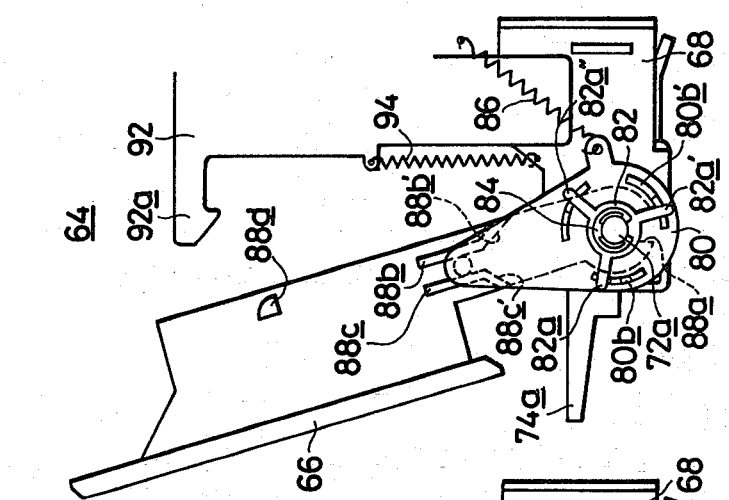
FIGS. 10A, 10B and 10C are side views of the cassette tape recorder of the first embodiment, depicting the assembling procedure of the holder to the recording and reproducing mechanism.
Figure 10B:
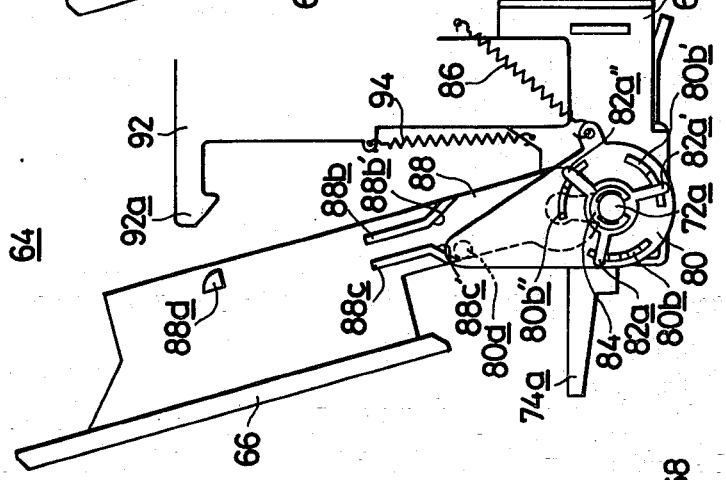
Figure 10A:
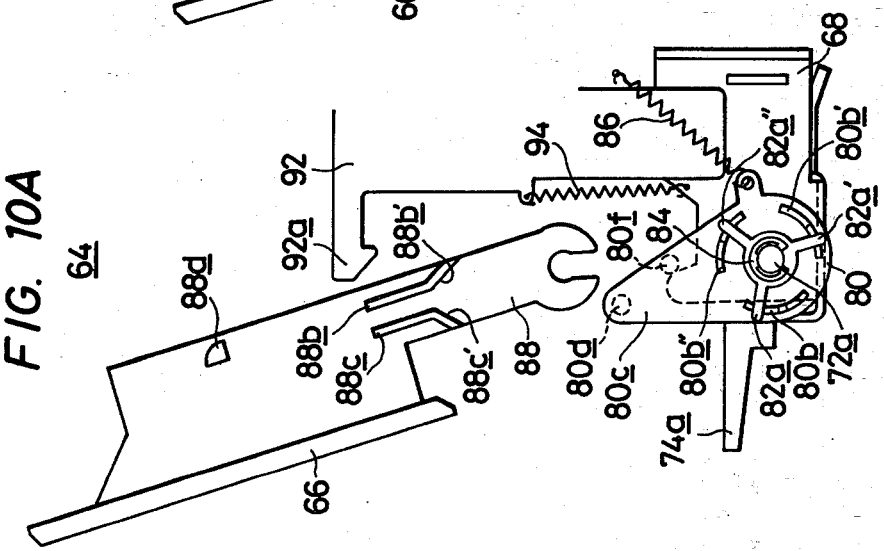

FIG. 10A shows a condition wherein the cassette holder 66 is completely separated from the remaining parts which have been assembled. In this condition, the rotating arm 80 keeps a position wherein the stopping projection 80f abuts on the inclined side of the recess 68a of the bracket 68. FIG. 10B shows a condition wherein the cassette holder 66 is about to be mounted to the assembled remaining parts. During movement of the arm portions 88 and 90 of the holder 66 toward the shaft 72, the stub 80d of the rotating arm 80 engages with the inside surface of the bent lower section 88c' of the rib 88c and then is received between the parallelly arranged sections of the ribs 88b and 88c. Upon this, the recesses 88a and 90a of the arm portions 88 and 90 are completely engaged with the shaft 72 for swinging movement thereof relative to the shaft 72 as is shown by FIG. 10C. When dismounting of the holder 66 is required, the procedure is reversed. By only pulling the holder 66 upward with a certain manual force, the holder 66 can be dismounted. Denoted by numerals 92, 92a, and 94 are a locking lever, a hook portion of the lever, and a spring all of which have the same functions as the locking lever 48, the hook portion 48a and the spring 58 of the first and second prior art examples (see FIGS. 1 and 2), respectively. Thus, when the cassette holder 66 is forced to pivot about the shaft 72 against the force of the spring 86 and takes the closed position thereof, the projection 88d of the holder 66 is caught with a snap by the hook portion 92a of the locking lever 92, permitting the casing 66 to be locked in the closed position. Under this condition, when an eject button (not shown) is pushed down, the locking lever 92 is shifted upward against the force of the locking spring 94 releasing the projection 88d of the cassette holder 66 from the hook portion 92a, with a result that the holder 66 is pivotted to take the open position thereof by the force of the spring 86. Now, it should be noted that the opening movement of the cassette holder 66 is slowly made or damped by the frictional contacts between the rotating arm 80 and the stationarily installed discal base member 78, and has been explained in the item of the braking mechanism 76.

FIG. 11 shows a second embodiment of the invention. The cassette tape recorder 64' of this embodiment comprises generally the same parts as in the case of the first embodiment except for the next-mentioned few parts. In this embodiment, a stub 88e is formed on the arm portion 88 instead of the ribs 88b and 88c of the first embodiment, and a pair of facing ribs 80g and 80h are formed on the rotating arm 80 instead of the stub 80d of the first embodiment. Upon proper mounting of the cassette holder 66 onto the shaft 72, the stub 88e of the arm portion 88 is received between the ribs 80g and 80h to achieve connection therebetween.

FIG. 12 shows a third embodiment according to the present invention. Also, the cassette tape recorder 64" of this embodiment is one which can be constructed by only making slight changes to the recorder of the first embodiment. The rotating arm 88 has at a free end thereof a pair of ribs 80i and 80j which are spaced from each other to snugly receive therebetween the recessed leading end of the arm portion 88. Upon proper mounting of the cassette holder 66 on the shaft 72, the arm portion 88 is seized by the ribs 80i and 80j and thus swingable therewith. Similarly to the first and second embodiments, dismounting of the holder 66 from the assembled remaining parts is easily made by only pulling up the holder 66 with a certain manual force.

As is apparent from the foregoing description, the shaft 72 acts as a common pivotting or rotating shaft for the cassette holder 66, the braking mechanism 76 and operation buttons (such as record, forward, reverse buttons, etc.). Thus, the cassette tape recorder of the invention can be constructed with reduced number of parts in comparison with the prior-mentioned prior art examples (FIGS. 1 to 4). This induces reduction in production cost. In fact, the use of the common shaft 72 on which not only the cassette holder 66 but also the braking mechanism are operatively mounted makes unnecessary complicated linking mechanism therebetween which are necessitated in the prior art examples. Further, the usage of the common shaft 72 assures a smooth transmission of the rotational movement of the cassette holder 66 to the braking mechanism 76 and vice versa. Further, since the cassette tape recorder of the invention is such constructed that the cassette holder 66 thereof is fixed to the assembled remaining parts at the final assembling step of the recorder, the mounting and dismounting of the cassette holder 66 to and from the assembled remaining parts can be made after the assembled parts are mounted to a cabinet (or decorative cover member). This will be understood from the next description.

Figure 13A:
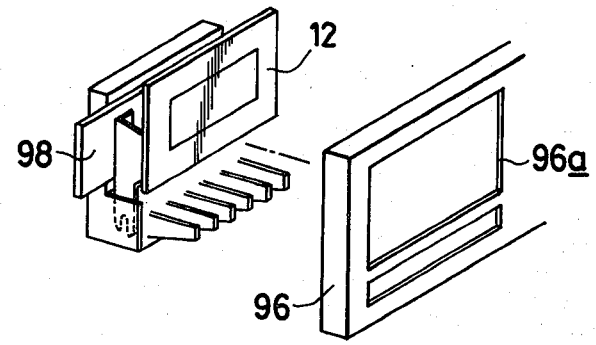
FIG. 13A is a view depicting the procedure to connect a conventional cassette tape recorder equipped with a cassette holder to a cabinet or decorative cover member.

FIG. 13A is a view for explaining a procedure to mount a major mechanism of the conventional cassette tape recorder, such as the recorders 10 and 10' of the first and second prior art examples, to a cabinet 96 (or decorative cover member). As has been mentioned in the item of the prior art, the mounting of the cassette holder 12 of the prior art to the assembled recording and reproducing mechanism can not be made at the final step of the assembling procedure of the recorder by the nature of construction thereof. Thus, in the prior art, it is necessary to provide the cabinet 96 with a large opening 96a which is sized to accommodate a rectangular front plate of the cassette holder 12. This not only induces reduction in mechanical strength of the cabinet 96 but also requires provision of a covering plate 98 which is disposed between the record and reproducing mechanism and the cassette holder 12 for concealing the mechanism from a view taken through a clearance between the bounding sides of the opening 96a of the cabinet 96 and the peripheral edges of the front edges of the front plate of the cassette receiving casing 12. Further, in the prior art, dismounting of the cassette holder 12 is quite troublesome because such dismounting requires dismounting of the assembled recording and mechanism from the cabinet 96. According to the invention, these drawbacks are eliminated as will become apparent from the following.

Figure 13B:
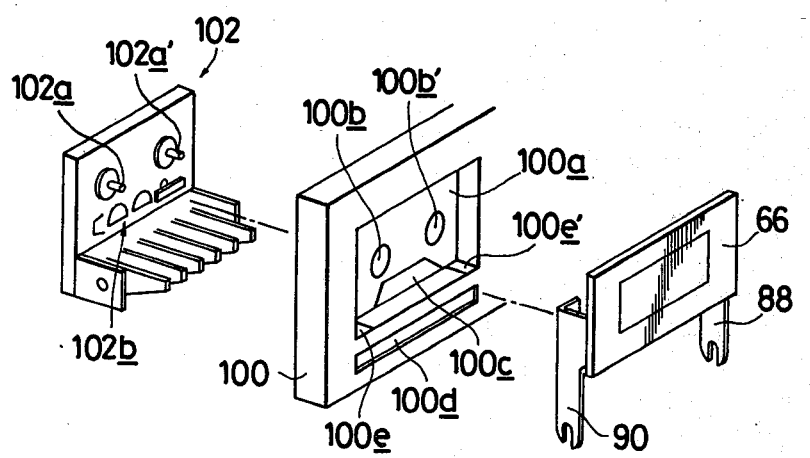
FIG. 13B is a view depicting a procedure to connect an improved cassette tape recorder of the invention to a cabinet.

FIG. 13B shows a procedure for mounting a major mechanism of the recorder of the invention to a cabinet 100. As has been mentioned hereinbefore, the mounting of the cassette holder 66 can be made at the final step of the assembling procedure of the recorder 64 in the invention. Thus, the mounting of the holder 66 to the record and reproducing mechanism can be made after the mechanism is attached to the cabinet 100. The cabinet 100 shown has a rectangular recess 100a which is defined by a bottom wall, upper and lower side walls, and right and left side walls (no numerals). The bottom wall has two spaced circular openings 100b and 100b' and a trapezoidal opening 100c for receiving therein reel drive shafts 102a and 102a' and recording and reproducing magnetic heads 102b of the recording and reproducing mechanism 102, respectively, when assembled together. Designated by numeral 100d is an elongate opening of the cabinet 100 into which operation buttons of the recording and reproducing mechanism 102 are inserted when the mechanism 102 and the cabinet 100 are assembled together. The rectangular recess 100a of the cabinet 100 is formed at its lower both sides with openings 100e and 100e' into which the arm portions 88 and 90 of the cassette holder 66 are to be inserted when the assemblage of the holder 66 with the mechanism 102 is accomplished. Thus, it will be appreciated that the mounting and dismounting of the holder 66 to and from the recording and reproducing mechanism 102 can be made after assemblage of the mechanism 102 with the cabinet 100, and such mounting and dismounting procedure can be made from the front of the cabinet 100. Further, it will be appreciated that the provision of the bottomed recess 100a makes a separate cover member such as the covering plate 98 of FIG. 13A unnecessary, and does not lower the mechanical strength of the cabinet 100.

What is claimed is:

1. A cassette tape recorder having a housing with an opening therein, and including:
   a shaft extending between spaced parallel brackets mounted on said housing adjacent to said opening;
   a cassette holder for holding therein a tape cassette and having a pair of arms pivotally mounted on said shaft to rotate thereabout between a loading position in which said holder is outside said opening for loading and unloading of said cassette, and an operative position in which said holder is inside said opening;
   a slip-friction member axially slidably mounted on said shaft and engaged loosely with one said holder arm for unitary rotation therewith and having a surface for making contact with a stationary surface when said slip-friction member axially slides toward said stationary surface;
   first biasing means for urging said holder toward said loading position; and
   second biasing means for urging said slip-friction member toward said stationary surface to produce slip friction between said contacting surfaces when said holder is rotated from said operative position to said loading position by the action of said first biasing means.

2. A cassette tape recorder as claimed in claim 1 wherein each of said arms of the holder is formed with a recess in which said shaft engages.

3. A cassette tape recorder as claimed in claim 1 wherein said holder arms are both located between said brackets.

4. A cassette tape recorder as claimed in claims 1 or 2 wherein said slip-friction member and said one holder arm are connected by an arrangement including a pin and a pair of spaced members engaging said pin.

5. A cassette tape recorder as claimed in claim 1 wherein said shaft extends outwardly through one of said brackets, and wherein said slip-friction member is pivotally slidably mounted on the outwardly extending portion of said shaft.

6. A cassette tape recorder as claimed in claim 1 wherein said stationary surface is formed by a rotationally stationary member located between one of said brackets, to which said stationary member is secured, and the surface of said slip-friction member.

7. A cassette tape recorder as claimed in claim 1 wherein said second biasing means is adjustable.

8. A cassette tape recorder as claimed in claim 7 wherein said second biasing means is a leaf spring, and including a stepped member between said spring and said slip-friction member.

9. A cassette tape recorder as claimed in claim 8 wherein said leaf spring has radially extending prongs at equal angular spacing.

10. A cassette tape recorder as claimed in claim 1 wherein said first biasing member is provided between said slip-friction member and said housing.

11. A cassette tape recorder as claimed in claim 1 wherein a plurality of operating keys are pivotally mounted on said shaft for effecting a desired tape operation.

12. A cassette tape recorder as claimed in claim 1 wherein a layer of viscous liquid is provided between said contacting surfaces.

* * * * *